United States Patent [19]
Walger et al.

[11] Patent Number: 5,261,927
[45] Date of Patent: Nov. 16, 1993

[54] DEFOAMER

[75] Inventors: Kristina M. Walger, Charlotte, N.C.; Patrick L. Magee, Acworth, Ga.

[73] Assignee: Henkel Corporation, Plymouth Meeting, Pa.

[21] Appl. No.: 994,378

[22] Filed: Dec. 21, 1992

[51] Int. Cl.$^5$ .............. C09B 67/00; B01D 17/00; B01D 19/04

[52] U.S. Cl. .............. 8/552; 8/553; 8/554; 252/321; 252/358

[58] Field of Search .......... 8/552, 553, 554; 252/321, 358

[56] References Cited

U.S. PATENT DOCUMENTS

| | | | |
|---|---|---|---|
| 4,192,761 | 3/1980 | Peltre et al. | 252/321 |
| 4,208,301 | 6/1980 | Gammon | 252/321 |
| 4,221,600 | 9/1980 | Alexander | 252/321 |
| 4,225,456 | 9/1980 | Schmidt et al. | 252/321 |
| 4,443,357 | 4/1984 | Maloney et al. | 252/321 |
| 4,445,971 | 5/1984 | Lappi et al. | 252/321 |
| 4,451,390 | 5/1984 | Flannigan | 252/321 |
| 4,465,613 | 8/1984 | Carter | 252/321 |
| 4,956,119 | 9/1990 | Friel, Jr. et al. | 252/321 |

*Primary Examiner*—Paul Lieberman
*Assistant Examiner*—William S. Parks
*Attorney, Agent, or Firm*—Ernest G. Szoke; Wayne C. Jaeschke; John E. Drach

[57] ABSTRACT

A defoamer for use in textile dyeing operations is comprised of mineral oil, high density polyethylene, a di-(ethoxyalkyl) ester of phosphoric acid, hydrophobic silica, and a blend of nonionic surfactants.

7 Claims, No Drawings

DEFOAMER

BACKGROUND OF THE INVENTION

1. Field of the Invention

This invention relates to defoamer emulsion compositions for use in textile dyeing operations.

2. Description of the Related Art

Defoamers used in textile dyeing must be efficient at reducing foam in aqueous media in dyebaths having high electrolyte concentrations. Most commercial defoamers used in textile dyeing operations are silicone-based materials which suffer from the disadvantage that some of the defoamer material adheres to the fibers being dyed resulting in non-uniform dye application. In addition, silicone-based defoamers are not stable in aqueous media having elevated electrolyte concentrations such as dyebaths containing about 120 g/L of Glauber's Salt.

The defoamers according to the invention do not suffer from the above disadvantages because they do not contain silicone and, hence, do not adhere to the fibers being dyed resulting in non-uniform dye application. The defoamers according to the invention are also stable in aqueous media having elevated electrolyte concentrations.

SUMMARY OF THE INVENTION

Defoamers containing no silicone have been surprisingly discovered for use in textile dyeing operations and which are comprised of mineral oil, high density polyethylene, a di-(ethoxyalkyl) ester of phosphoric acid, hydrophobic silica, and nonionic surfactants. The defoamers according to the invention are made by a process which comprises first forming a hot solution by heating a mixture of high density polyethylene and mineral oil to a temperature of from about 140° C. to about 150° C. The hot solution is then added to a cold solution which is comprised of mineral oil and a di-(ethoxyalkyl) ester of phosphoric acid wherein each of the ester groups of said diester is independently an ethoxylated $C_{8-12}$ alkyl group wherein the degree of ethoxylation is from 1 to 10. The hot solution is added, with stirring, to the cold mineral oil solution at such a rate that the temperature of the cold solution is maintained at a temperature of less than 45° C. After all the hot solution has been added, water, hydrophobic silica, and a nonionic surfactant package comprised of an ethoxylated dinonyl or dioctyl phenol, a dioleate ester of polyethylene glycol, and a ethoxylated hydrogenated castor oil. The resulting mixture is then agitated to homogenize it.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

The mineral oil which can be used in the defoamers according to the invention is any 80–150 sec mineral oil or paraffin oil. The preferred mineral oil is 105 second naphthenic-paraffinic oil such as Tufflo ® 100C, a trademark product of Arco Chemical, Newtown Square, Pa., 19073.

The polyethylene which can be used in the defoamers according to the invention is high density polyethylene having a softening point of from 100° C. to 140° C. High density polyethylene is described in Volume 6 of The Encyclopedia of Polymer Science and Engineering, pages 454–489, the entire contents of which are incorporated herein by reference. The preferred high density polyethylene is one which has a softening point of 130° C. such as AC ®392, a trademark product of Allied Signal, Inc., Morristown, N.J., 07962. The amount of high density polyethylene in the mineral oil can range from 1% to 10% and will typically be from 1% to 3% by weight.

The di-(ethoxyalkyl) ester of phosphoric acid which can be used in the defoamers according to the invention are those in which each of the ester groups of said diester is independently an ethoxylated $C_{8-12}$ alkyl group wherein the degree of ethoxylation is from 1 to 10. The preferred phosphate ester is an di-ethoxylated dodecyl ester having a degree of ethoxylation equal to 4 such as Ethfac 142W, a product of Ethox Chemicals, Inc., Greenville, S.C. The amount of di-(ethoxyalkyl) phosphate ester in the mineral oil can range from 8.0 to 8.5% by weight and will typically be 8.3 to 8.4% by weight.

The hydrophobic silica which can be used in the defoamers according to the invention is any precipitated silica-based hydrophobic silica. The preferred hydrophobic silica is Foamaster ® 2219X, a trademark product of Henkel Corporation, Ambler, Pa., 19002. The amount of hydrophobic silica can range from 5% to 80% and will typically be from 14% to 15% by weight.

One of the nonionic surfactants which can be used in the defoamers according to the invention are dioleate esters of polyethylene glycol. The polyethylene glycol portion of these diesters can have a molecular weight of from 100 to 600. The preferred dioleate ester is a PEG 600 dioleate wherein the polyethylene glycol portion has a molecular weight of 600, which is equivalent to a degree of ethylene oxide polymerization of 13–14. The amount of dioleate ester of polyethylene glycol can range from 1% to 9% and will typically be from 5% to 6% by weight. Another of the nonionic surfactants which can be used in the defoamers according to the invention are ethoxylated dioctyl or dinonyl phenols having a degree of ethoxylation of from 6 to 15. The preferred compound in this class is dioctyl phenol having a degree of ethoxylation of 9. The amount of ethoxylated dioctyl or dinonyl phenol can range from 0.5% to 7.0% and will typically be from 1% to 1.5% by weight. Another of the nonionic surfactants which can be used in the defoamers according to the invention are ethoxylated hydrogenated castor oils such as Dacospin ® 12-R, a trademark product of Henkel Corporation, Ambler, Pa., 19002. The amount of ethoxylated hydrogenated castor oil can range from 0.5% to 7.0% and will typically be from 2% to 3% by weight.

The following examples are meant to illustrate but not to limit the invention.

EXAMPLE 1

Preparation of Defoamer

About 2.95 grams of high density polyethylene (AC ®392) were added to 21.55 grams of mineral oil (Tufflo ® 100C). The mixture was stirred and heated to a temperature of from 140° C. to 150° C. A second mineral oil solution was prepared which was comprised of 43.2 grams of mineral oil (Tufflo ® 100C) and 8.35 grams of Ethfac 142W. The temperature of the second mineral oil solution was adjusted to 20° C.±2° C. The hot mineral oil solution was added to the cold mineral oil solution, with stirring, at such a rate as to maintain the temperature of the colder solution below 45° C. After all of the hot mineral oil solution was added, the mixing was continued at reduced agitator speed (45-50% reduction) for about one-half hour at which time the remaining components were added in the following order: 5.5 grams of PEG 600 dioleate Nopco ® Color-Sperse 188A PEG 600 dioleate, a trademark product of Henkel Corporation, Ambler, Pa., 19002; 2.75 grams of Dacospin ® 12-R ethoxylated hydrogenated castor oil, a trademark product of Henkel Corporation, Ambler, Pa., 19002; 14.4 grams of Foamaster ® hydrophobic silica, a trademark product of Henkel Corporation, Ambler, Pa., 19002, which was mixed well before adding; 0.30 grams of water; and 1.00 grams of Hyonic ® OP-55 dioctyl phenol-E0-9, a trademark product of Henkel Corporation, Ambler, Pa., 19002. The entire mixture was then homogenized at 4,500-5,000 psi and 40° C.±5° C. until the viscosity was 1,000-2,400 cps measured at 25° C. using a Brookfield ® Viscometer equipped with a #3 spindle operating at 30 rpm.

EXAMPLE 2

Salt Stability Test

The defoamer according to the invention exhibits excellent salt stability. To test the salt stability of the product, 2.0 grams of the defoamer produced according to Example 1 was diluted with 18 grams of water. The diluted product was added (no stirring) to 280 grams of a 10.7% by weight aqueous sodium sulfate solution and heated to 200° F. The product exhibited the required salt stability in that no cream or scum was observed on the surface of the liquid.

COMPARATIVE EXAMPLE

The defoamer prepared according to Example 1 (Product C) was compared to Foamblock RS, a trademark product of Boehme-Silatex (Product A) and Burst 100, a trademark product of Hydrolabs (Product B), each of which is a commercial defoamer used in dyeing operations.

| DEFOAMER | APPEARANCE AFTER SALT STABILITY TEST |
|---|---|
| A | Clear to hazy solution with oil globules floating on the surface |
| B | Clear to hazy solution with oil globules floating on the surface. |
| C | Homogeneous white emulsion with no cream on surface |

What is claimed is:

1. A mineral oil-based defoamer comprising from about 1 to 10% by weight of the entire composition high density polyethylene, from about 8.0 to 8.5% by weight of the entire composition of a di-(ethoxyalkyl) ester of phosphoric acid wherein each of the ester groups of said diester is independently an ethoxylated $C_{8-12}$ alkyl group wherein the degree of ethoxylation is from 1 to 10, from about 5 to 80% by weight of the entire composition hydrophobic silica, from about 1 to 9% by weight of the entire composition of a dioleate ester of polyethylene glycol, from 0.5 to 7% by weight of the entire composition of an ethoxylated dioctyl or dinonyl phenol and from 0.5 to 7% by weight of the entire composition of an ethoxylated hydrogenated castor oil.

2. The defoamer according to claim 1 wherein said mineral oil is a 105 second naphthenic-paraffinic oil.

3. The defoamer according to claim wherein said dioleate ester of polyethylene glycol is a PEG 600 dioleate.

4. A defoamer comprising about 65% by weight of a 105 second naphthenic-paraffinic oil; about 2.9% by weight of a high density polyethylene having a softening point of 130° C.; about 8.5% of a di-(ethoxyalkyl) ester of phosphoric acid wherein each of the ester groups of said diester is independently an ethoxylated $C_{8-12}$ alkyl group wherein the degree of ethoxylation is from 1 to 10; about 5.5% by weight of PEG 600 dioleate; about 2.8% of an ethoxylated hydrogenated castor oil; about 14.5% by weight of hydrophobic silica; about 1.0% by weight of dioctyl phenol-EO-9; and about 0.3% by weight of water.

5. A process for making a defoamer which comprises the steps of: (1) forming a hot solution by heating a mixture of high density polyethylene and mineral oil; (2) adding said hot solution to a cold solution which is comprised of mineral oil and a di-(ethoxyalkyl) ester of phosphoric acid wherein each of the ester groups of said diester is independently an ethoxylated $C_{8-12}$ alkyl group wherein the degree of ethoxylation is from 1 to 10 such that the temperature of the cold solution is maintained at a temperature of less than 45° C.; (3) adding to the solution formed in step (2) water, hydrophobic silica, an ethoxylated dinonyl or dioctyl phenol, a dioleate ester of polyethylene glycol, and an ethoxylated hydrogenated castor oil; (4) homogenizing the mixture formed in step (3).

6. The process according to claim 5 wherein said mineral oil is a 105 second naphthenic-paraffinic oil.

7. The process according to claim 5 wherein said dioleate ester of polyethylene glycol is a PEG 600 dioleate.

* * * * *

UNITED STATES PATENT AND TRADEMARK OFFICE
CERTIFICATE OF CORRECTION

PATENT NO. : 5,261,927
DATED : Nov. 16, 1993
INVENTOR(S) : Walger et al.

It is certified that error appears in the above-identified patent and that said Letters Patent is hereby corrected as shown below:

column 3, line 47, "Boehme-Silatex" should read: -- Boehme-Filatex --.

In claim 3, column 4, line 25, after "claim" insert -- 1 --.

Signed and Sealed this

Eighth Day of November, 1994

*Attest:*

BRUCE LEHMAN

*Attesting Officer*     *Commissioner of Patents and Trademarks*